March 19, 1940.                S. EGGLESTON                2,194,219
                    BRAKE AND ACCELERATOR FOR CONVEYERS
                          Filed Feb. 25, 1939

Inventor
Smith Eggleston
By Stryker & Stryker
Attorneys

Patented Mar. 19, 1940

2,194,219

UNITED STATES PATENT OFFICE 2,194,219

BRAKE AND ACCELERATOR FOR CONVEYERS

Smith Eggleston, St. Paul, Minn., assignor to Standard Conveyor Company, North St. Paul, Minn., a corporation of Minnesota Application February 25, 1939, Serial No. 258,549

7 Claims. (Cl. 198—127)

It is an object of this invention to provide novel means for stopping and starting loads on roller conveyers.

A particular object is to provide a roller conveyer with power actuated means for engaging the peripheries of some of the rollers to start or stop the loads on the conveyer, the device being particularly although not exclusively adapted for use where the movement of heavy loads is to be controlled on a gravity roller conveyer.

Other objects will appear and be more fully pointed out in the following specification and claims.

The invention will be best understood by reference to the accompanying drawing in which.

Figure 1:
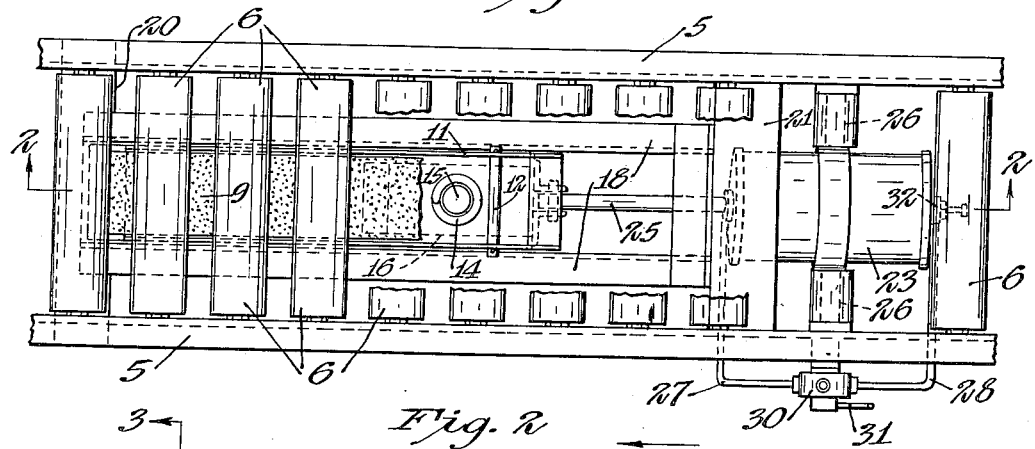
Figure 1 is a plan view of a conveyer with my improved brake and accelerating mechanism mounted thereon, a number of the conveyer rollers and an end portion of the friction member being broken away to show parts otherwise concealed.

In the drawing the side rails of a conveyer are indicated by the numeral 5 and a multiplicity of freely revoluble rollers 6 for supporting the loads are mounted between the rails 5 in the usual or suitable manner. A load 7 to be conveyed is shown in place on the rollers 6, suitable skids 8 being interposed between the bottom of the load and the upper peripheries of the rollers 6. The rails 5 may be inclined longitudinally to allow the load to move by gravity along the conveyer from right to left, as indicated by an arrow in Fig. 2.

Extending longitudinally of the conveyer beneath a plurality of the rollers 6 is a friction contact member 9 supported on a channel shaped bar 10. This bar 10 has flanges along its side edges extending down between similar flanges on a second channel bar 11. The bars 10 and 11 are connected together near their ends by horizontally extending shafts 12, these shafts projecting through perforations in the bar 11 and through vertically elongated slots 13 formed in the bar 10. Coiled springs 14 are mounted between the bars 10 and 11 and are confined on studs 15 projecting up from the bar 11. The springs 14 resiliently raise the bar 10 relative to the bar 11 under the guidance of the shafts 12 in the slots 13. A pair of cam blocks 16 are fixed on the bottom of the bar 11 and extend longitudinally thereof to support this bar on a pair of rollers 17 which are mounted between frame members 18 extending parallel to the rails 5 of the conveyer. The frame members 18 are rigidly spaced in parallel relation to each other by cross members 19, 20 and 21, the ends of the members 20 and 21 being rigidly secured to the rails 5 of the conveyer.

Figure 4:
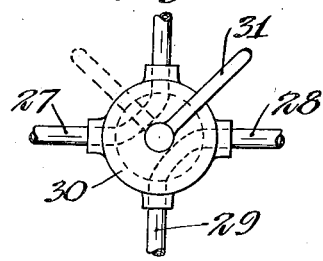
Fig. 4 is a front view of a suitable manually operable valve for controlling the brake and accelerating mechanism.

Power for moving the friction member 9 and supporting structure longitudinally of the conveyer is supplied by fluid under pressure acting in a cylinder 23 containing a piston 24 connected by a piston rod 25 to one end of the channel bar 11. The axis of the cylinder 23 extends in the vertical center plane through the bar 11 and the cylinder is provided with horizontally extending shafts 26 having bearings supported on the rails 5, as best shown in Fig. 1. As indicated in Figs. 1 and 4, flexible pipes 27 and 28 are connected respectively to opposite ends of the cylinder 23 to supply fluid under pressure thereto from a third pipe 29 under control of a valve 30. The valve 30 has a handle 31 which may be manipulated to admit fluid under pressure to one end of the cylinder while exhausting the fluid from the opposite end. This valve is so arranged that the piston 24 may be actuated toward either end of the cylinder. To provide for adjustment of the rate of movement of the piston, valves 32 are placed at the junctions respectively of the pipes 27 and 28 with the cylinder 23, the degree of opening of the valves 32 determining the rate of flow of the fluid under pressure to the cylinder. The valve 30 is located within convenient reach of an operator stationed at a side of the conveyer.

Figure 2:
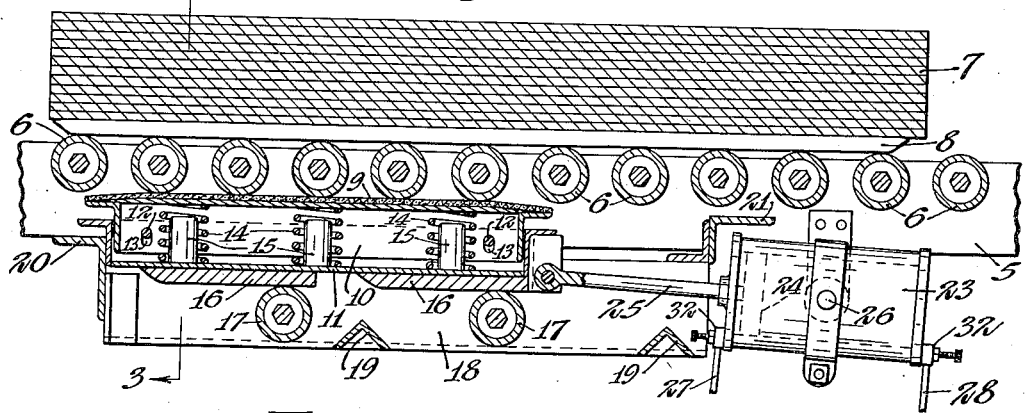
Fig. 2 is a vertical section taken on the line 2—2 of Fig. 1, showing a load in place on the conveyer.
Figure 3:
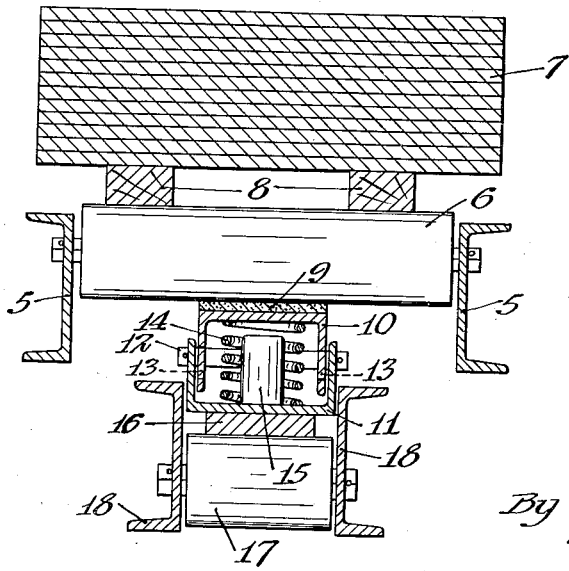
Fig. 3 is a section on a larger scale, taken on the line 3—3 of Fig. 2.

My invention may be used at various points along a conveyer where it is desired to control the movement of the loads either by holding them stationary and then starting them along the conveyer or by stopping them and then accelerating them. For example, the device may be located at a loading station of a gravity conveyer where heavy loads 7 are to be placed on the rollers 6. The load 7 illustrated is of the type consisting of a pile of heavy metal plates which may weigh several thousand pounds. In this case the friction member 9 is retained in contact with the rollers 6 while the conveyer is loaded, as shown in Figs. 2 and 3. When the load is to be started, the valve handle 31 is moved to its dotted line position (Fig. 4) so that fluid under pressure is admitted to the left end of the cylinder 23 and fluid is exhausted from the opposite end of the cylinder. This causes the piston 24 to be moved toward the right so that the rod 25 actuates the friction member 9 to the right in frictional contact with the lower peripheries of a number of the rollers 6. The group of rollers is thereby turned in unison and the load on the rollers is started along the conveyer. As the piston 24 approaches the end of its stroke to the right the cam shoes 16 coact with the rollers 17 to allow the bars 10 and 11 to drop and carry the friction member 9 out of contact with the rollers 6. The latter are thereby released to revolve freely, thus permitting the load to continue by gravity along the conveyer to the left as the piston 24 stops at the right end of the cylinder 23 as seen in Fig. 2.

When it is desired to apply the braking force to the rollers again, the valve handle 31 is merely moved to the full line position shown in Fig. 4, whereupon the piston 24 is actuated to the left. As the motion in this direction starts, the cam shoes 16 ride up on the rollers 17 to raise the structure carrying the member 9 into resilient contact with the rollers 6 above. As the stroke toward the left continues the rollers in contact with the member 9 are rotated in the clockwise direction until the piston reaches the end of its stroke, when rotation of the rollers is stopped.

The springs 14 compensate for wear on the several, relatively movable, contacting surfaces, promote smoothness in operation and also make it unnecessary in the construction of the device to locate the top surface of the member 9 precisely at a fixed elevation for engagement with the peripheries of the rollers 6. When very heavy loads are to be conveyed the valves 32 should be adjusted to produce a relatively gradual acceleration, whereas, for the lighter loads more rapid acceleration is practical and these valves may be adjusted to increase the speed of the piston.

It will be understood that my invention may be used at various stations along a conveyer where it is desired to arrest or divert and then start or otherwise control the loads. For example, in rolling mills it is frequently desirable to weigh the loads at a scale located along the path of travel. In such a case my device may be mounted on the weighing scale platform to stop loads thereon while they are weighed and then to discharge them to a conveyer continuing beyond the scales. The conveyers extending to and from my brake and accelerator may be of the live roller or other power-driven type, as well as of the gravity type.

Having described my invention, what I claim as new and desire to protect by Letters Patent is:

1. A device of the class described comprising a conveyer having a plurality of load supporting rollers normally free for rotation, a friction member mounted beneath said rollers to engage the lower peripheries thereof, said member being movable longitudinally of the conveyer and to and from said rollers to alternately turn and release the same, power-driven means for actuating said friction member longitudinally of the conveyer and means for actuating said member to and from engagement with the peripheries of said rollers.

2. In a device of the class described, a series of load-supporting rollers, a friction member for engaging the lower peripheries of said rollers, a resilient support for said friction member, power-driven means for actuating said support and member longitudinally of the conveyer with said member in rolling contact with said rollers and cam means for actuating said friction member to engage the peripheries of said rollers.

3. A device of the class described comprising a conveyer having a plurality of load supporting rollers normally free for rotation, a friction member resiliently supported beneath said rollers to engage the lower peripheries thereof, said member being movable longitudinally of the conveyer, power-driven means for actuating said friction member longitudinally of the conveyer and cam means for actuating said member to engage the peripheries of said rollers, said cam means permitting the spacing of said member from said rollers at a predetermined point in the path of travel of said member.

4. A device of the class described comprising a conveyer having a plurality of load supporting rollers normally free for rotation, a friction member mounted beneath said rollers to engage the lower peripheries thereof, said member being movable longitudinally of the conveyer and to and from said rollers, fluid pressure means for imparting reciprocating motion to said friction member longitudinally of the conveyer and means for retaining said member in frictional engagement with the peripheries of said rollers during the greater part of the path of movement of said member longitudinally of the conveyer.

5. In a device of the class described a conveyer frame, a plurality of load supporting rollers revolubly supported on said frame, a friction member mounted beneath said rollers to engage the lower peripheries thereof, a carriage supporting said member for movement longitudinally of the conveyer, power-driven means for imparting reciprocating movement to said carriage longitudinally of the conveyer and cam means for actuating said carriage toward said rollers, said cam means permitting movement of said member to free said rollers at a predetermined point in the path of movement of said carriage.

6. In a device of the class described a conveyer frame, a plurality of load supporting rollers revolubly supported on said frame, a friction member mounted beneath said rollers to engage the lower peripheries thereof, a carriage movable longitudinally of the conveyer and to and from the rollers beneath the same, springs resiliently supporting said member on said carriage, fluid pressure means for imparting reciprocating movement to said carriage longitudinally of the conveyer and cam means for actuating said carriage toward said rollers, said cam means permitting movement of said member to free said rollers at a predetermined point in the path of movement of said carriage.

7. A device of the the class described comprising, a conveyer having a plurality of load supporting rollers normally free for rotation, a friction member mounted beneath said rollers to engage the lower peripheries thereof, said member being movable longitudinally of the conveyer and to and from the lower peripheries of said rollers, means for imparting reciprocating motion to said friction member longitudinally of the conveyer and means for actuating said friction member to and from frictional engagement with the peripheries of said rollers during said reciprocating movement.

SMITH EGGLESTON.